United States Patent
Venkata et al.

(10) Patent No.: US 7,180,972 B1
(45) Date of Patent: Feb. 20, 2007

(54) CLOCK SIGNAL CIRCUITRY FOR MULTI-PROTOCOL HIGH-SPEED SERIAL INTERFACE CIRCUITRY

(75) Inventors: Ramanand Venkata, San Jose, CA (US); Chong H Lee, San Ramon, CA (US)

(73) Assignee: Altera Corporation, San Jose, CA (US)

( * ) Notice: Subject to any disclaimer, the term of this patent is extended or adjusted under 35 U.S.C. 154(b) by 820 days.

(21) Appl. No.: 10/273,899

(22) Filed: Oct. 16, 2002

(51) Int. Cl.
   *H04L 7/00* (2006.01)
(52) U.S. Cl. ...................................... 375/371
(58) Field of Classification Search ............... 375/354, 375/355, 356, 357, 362, 371, 376; 326/93; 377/64, 77, 78; 702/85, 89; 713/375, 400; 710/61, 58, 171, 65, 62; 379/9.06, 91.01
   See application file for complete search history.

(56) References Cited

U.S. PATENT DOCUMENTS

| | | | |
|---|---|---|---|
| 3,473,160 A | | 10/1969 | Wahlstrom ............... 340/172.5 |
| 5,297,201 A | * | 3/1994 | Dunlavy ..................... 380/252 |
| 5,355,090 A | * | 10/1994 | Pajowski et al. ........... 327/292 |
| 5,442,658 A | * | 8/1995 | Cuny et al. ................. 375/356 |
| 5,668,830 A | * | 9/1997 | Georgiou et al. ........... 375/220 |
| 6,282,204 B1 | * | 8/2001 | Balatoni et al. ............ 370/421 |
| 6,871,301 B1 | * | 3/2005 | Deng ......................... 714/700 |

OTHER PUBLICATIONS

U.S. Appl. No. 09/805,843, filed Mar. 13, 2001, Aung et al.
U.S. Appl. No. 10/093,785, filed Mar. 6, 2002, Lee et al.
U.S. Appl. No. 10/195,229, filed Jul. 11, 2002, Venkata et al.

* cited by examiner

*Primary Examiner*—Pankaj Kumar
(74) *Attorney, Agent, or Firm*—Fish & Neave IP Group Ropes & Gray LLP; Robert R. Jackson (57) ABSTRACT

A programmable logic device ("PLD") includes high-speed serial interface ("HSSI") circuitry. The HSSI circuitry includes clock signal circuitry that allows various components of the HSSI circuitry to be clocked in different ways to facilitate use of the HSSI circuitry to support a number of different communication protocols. Some of the HSSI clock signals may be routed through the clock distribution network of the associated PLD logic circuitry. The HSSI circuitry may include phase compensation buffer circuitry to compensate for possible phase differences across the interface between the HSSI circuitry and the associated PLD logic circuitry.

45 Claims, 10 Drawing Sheets

CLOCK SIGNAL CIRCUITRY FOR MULTI-PROTOCOL HIGH-SPEED SERIAL INTERFACE CIRCUITRY

BACKGROUND OF THE INVENTION

This invention relates to high-speed serial interface ("HSSI") circuitry, and more particularly to clock circuitry for use in HSSI circuitry that can be used to support any of several different signalling protocols (e.g., as in a programmable logic device ("PLD") that may have any of several different uses).

If the circuitry of this invention is used in a device such as a PLD, the device can be either field programmable, mask programmable, or programmable in any other way. It will be understood that terms like "PLD," "programmable," and the like include all of these various options. Also, terms like HSSI and HSSC are used just for convenience herein and not with the intention of limiting the invention to any rigorously defined set of possible applications or uses. Thus the invention is applicable in any context that involves an appropriate type of communication or signalling.

High-speed serial communication ("HSSC") is becoming increasingly popular for many different communication applications. HSSC can take many forms, including (1) many industry-standard forms such as XAUI, Infiniband, Gigabit Ethernet, Packet Over SONET or POS-5, etc., and (2) any of a wide range of non-industry-standard or "custom" forms that particular users devise for their own uses. Such custom protocols often have at least some features similar to industry-standard protocols, but deviate from industry standards in other respects.

PLDs are typically designed to meet a wide range of different user needs. This is done so that a PLD can be manufactured in large quantities (and therefore at reduced unit cost) and sold to a large number of users for many different uses. There is increasing interest in using PLDs in applications involving HSSC. In keeping with the usual philosophy behind the design of PLDs (and in view of the many different HSSC protocols that are known and that can be developed), it is desirable for a PLD that may be used in HSSC applications to have considerable flexibility with regard to supporting different HSSC protocols.

Illustrative PLDs with certain HSSC capabilities are shown in Aung et al. U.S. patent application Ser. No. 09/805,843, filed Mar. 13, 2001, Lee et al. U.S. Pat. No. 6,650,140, and Venkata et al. U.S. Pat. No. 6,750,675. The PLDs shown in these references can support various HSSC protocols. But even greater flexibility in that regard would be desirable and is among the motivations for the present invention.

SUMMARY OF THE INVENTION

In accordance with certain aspects of the invention, interface circuitry for use between HSSC channels and other circuitry that uses and/or supplies the data communicated via those channels may include phase compensation for compensating for any difference in phase between data in the interface circuitry and data in the other circuitry associated with the interface circuitry. Clock signals that the phase compensation circuitry works with may be selected from any of several clock signal sources. These clock signal sources may include clock signal distribution circuitry in the other circuitry associated with the interface circuitry. In particular, one or more clock signals from the interface circuitry may be passed through that clock signal distribution circuitry and then back to the interface circuitry for use.

In accordance with other aspects of the invention, clock signals for use in any one or more of several data signal processing circuitries in the interface circuitry may be selected from any of several clock signal sources.

In accordance with still other aspects of the invention, one or more clock signals from the interface circuitry may be passed through clock signal distribution circuitry as mentioned above and returned to the interface circuitry for use in any of several data signal processing circuitries in the interface circuitry.

Further features of the invention, its nature and various advantages will be more apparent from the accompanying drawings and the following detailed description of presently preferred embodiments.

BRIEF DESCRIPTION OF THE DRAWINGS

FIG. 1 is a block diagram showing how FIGS. 2a–2f are to be assembled into one large drawing.

DETAILED DESCRIPTION

Although a number of additions and changes are included in accordance with the present invention, the three references mentioned above are a good starting point for considering this invention. For example, these references discuss various types of HSSC and various circuit components that can be used to support such HSSC. Many of the same HSSC principles are involved in the present invention. Because those principles have already been amply explained in the above-mentioned references, it will not be necessary to explain them again here. Similarly, because many of the HSSC circuit components employed in the present invention have already been explained in the above-mentioned references, it will also not be necessary to completely explain those components again here. Particular attention is called, for example, to the various, at least overall similarities among FIG. 2 herein, FIGS. 3 and 4 (and/or FIGS. 5 and 12) in the Lee et al. reference, and FIG. 4 in the Venkata et al. reference. Although the three references mentioned above are occasionally cited throughout this specification, it is not believed that the material in those references is essential to understanding or practicing the present invention. In other words, this specification is intended to be complete and adequate by itself. The other references are mentioned primarily as possible sources of additional information on certain points. Thus if more information is needed, those references are available to supply it.

Figure 1:
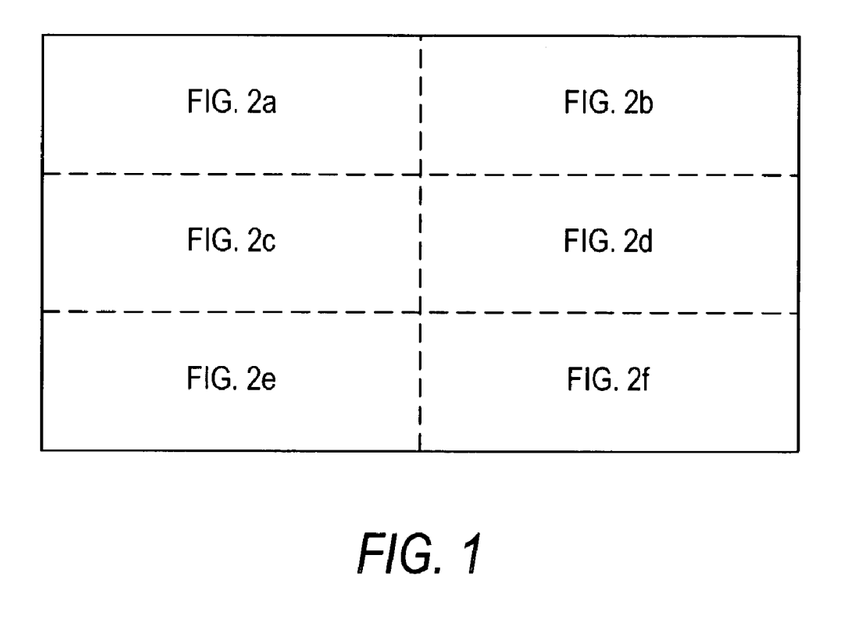

An illustrative embodiment of representative portions of HSSI circuitry in accordance with this invention is shown in FIGS. 2a–2f. These FIGS. are intended to be assembled as shown in FIG. 1 to produce one large FIG., which is sometimes referred to as "FIG. 2," meaning FIGS. 2a–2f collectively and arranged as shown in FIG. 1. As a general matter, connections to external circuitry are on the right in FIGS. 2b, 2d, and 2f. Connections to other circuitry that is associated with the HSSI circuitry are to the left in FIGS. 2a, 2c, and 2e. This other circuitry is typically circuitry that receives and uses the data signals that the HSSI circuitry has recovered from one or more incoming HSSC channels and/or that is the source of data signals the HSSI circuitry is to output via one or more outgoing HSSC channels. This other circuitry and the HSSI circuitry are typically (although not necessarily) all part of one integrated circuit. The other circuitry can be programmable logic circuitry, and so it is sometimes referred to herein as "PLD circuitry" or "associated PLD circuitry." It will be understood, however, that programmable logic circuitry is only one example, and that the other circuitry can alternatively be many other types of circuitry. References to that circuitry as PLD circuitry are therefore intended to be illustrative, not limiting.

Figure 2A:
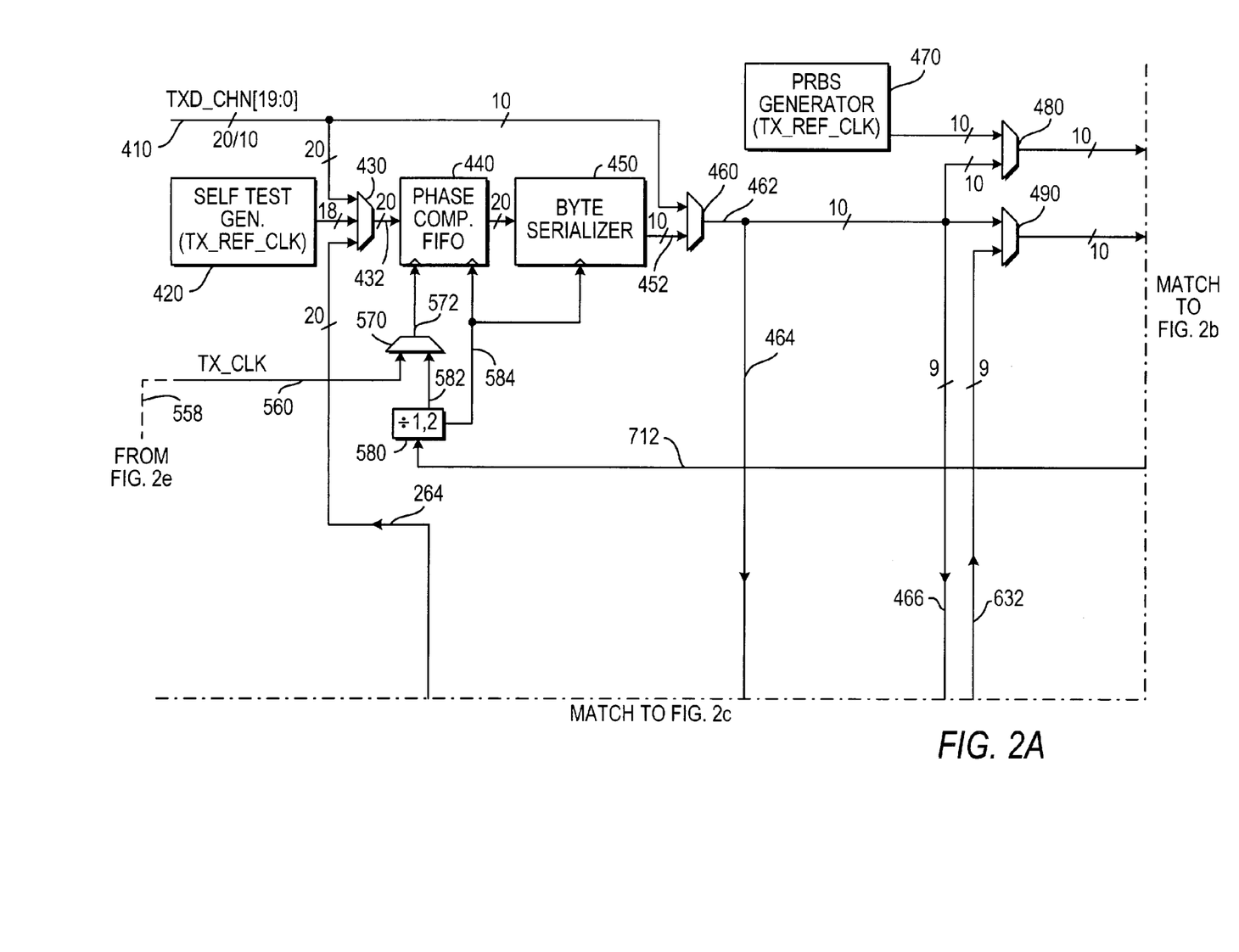
FIGS. 2a–2f (intended for arrangement as shown in FIG. 1) are collectively a simplified schematic block diagram of an illustrative embodiment of circuitry constructed in accordance with the invention.
Figure 2B:
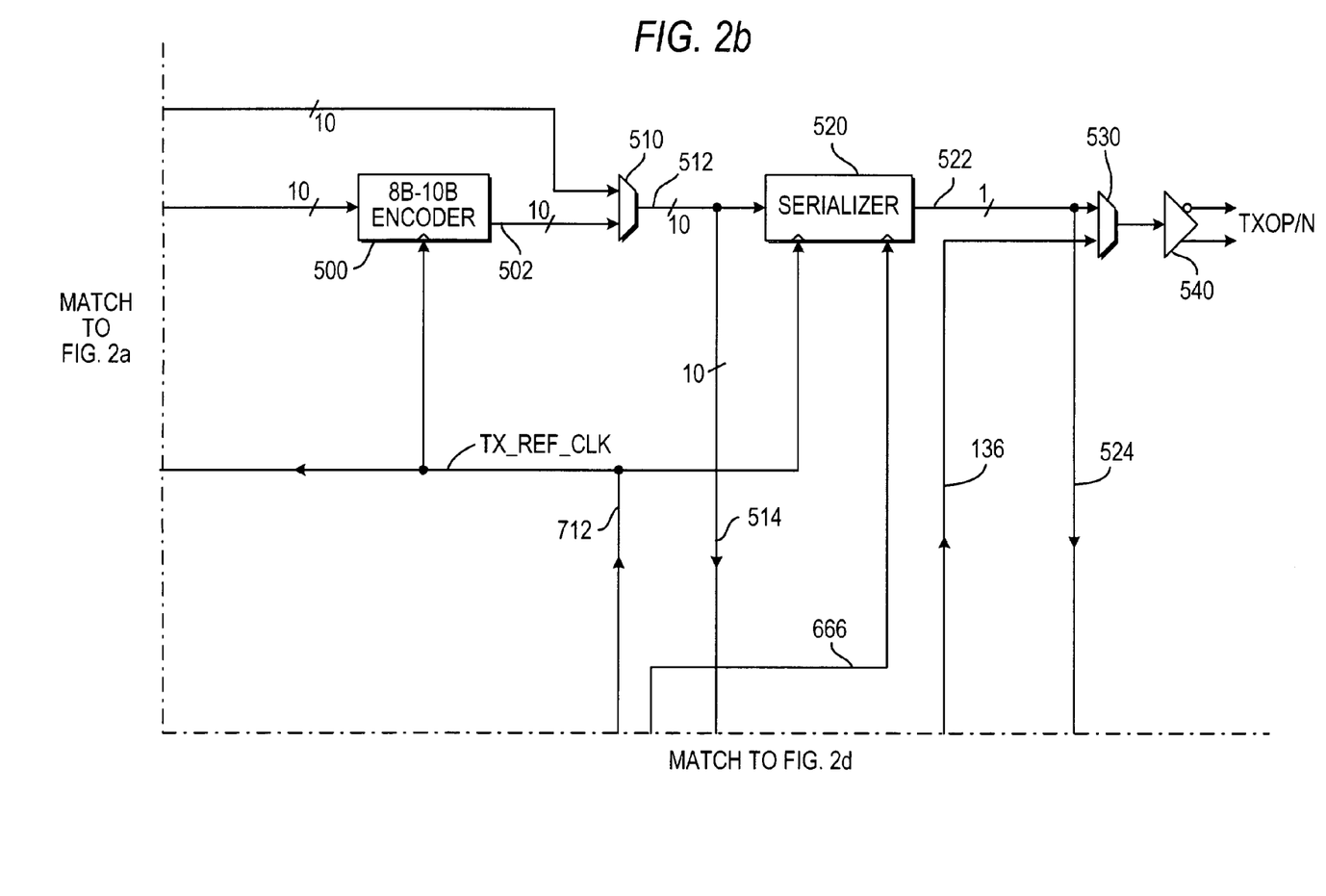
Figure 2C:
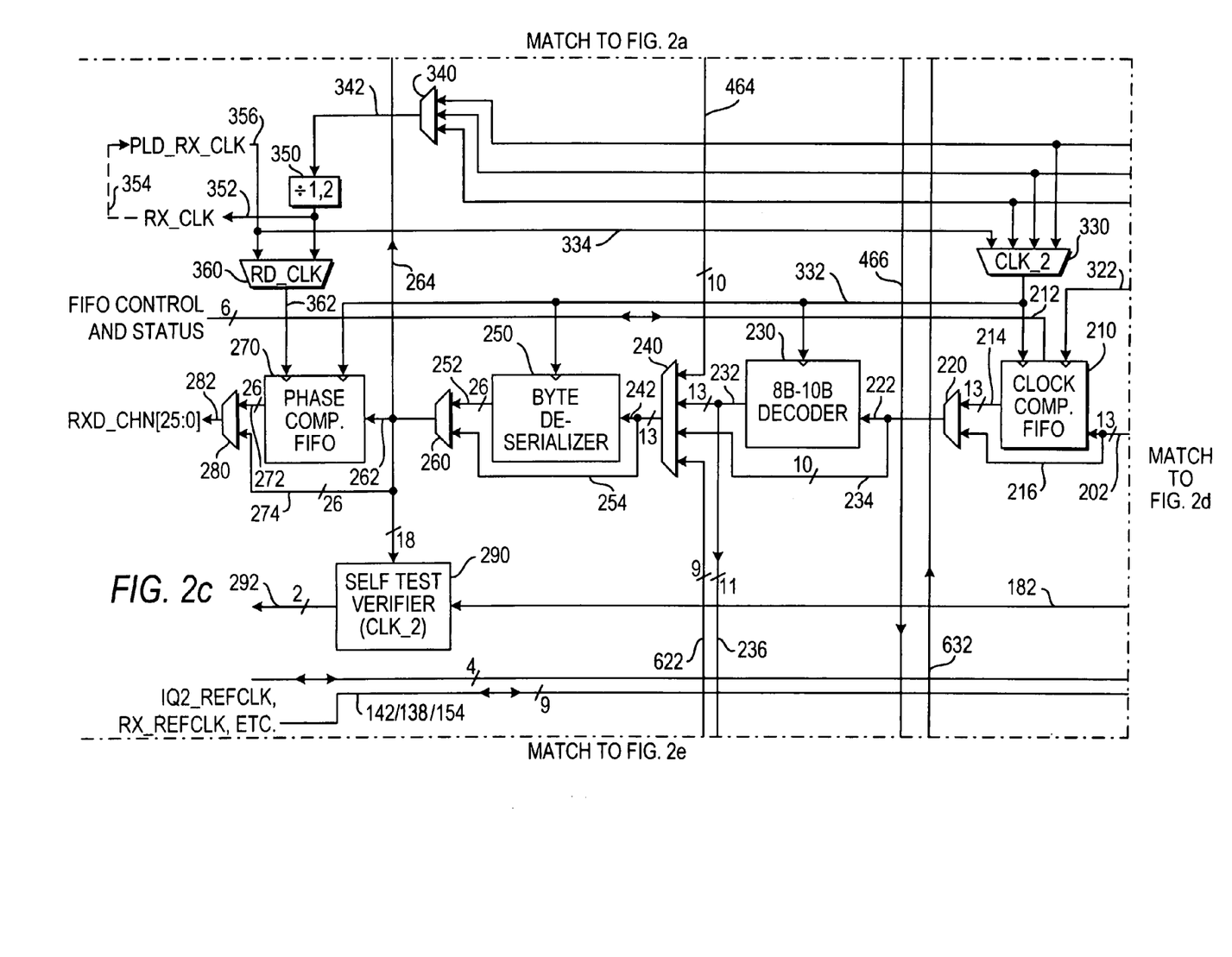
Figure 2D:
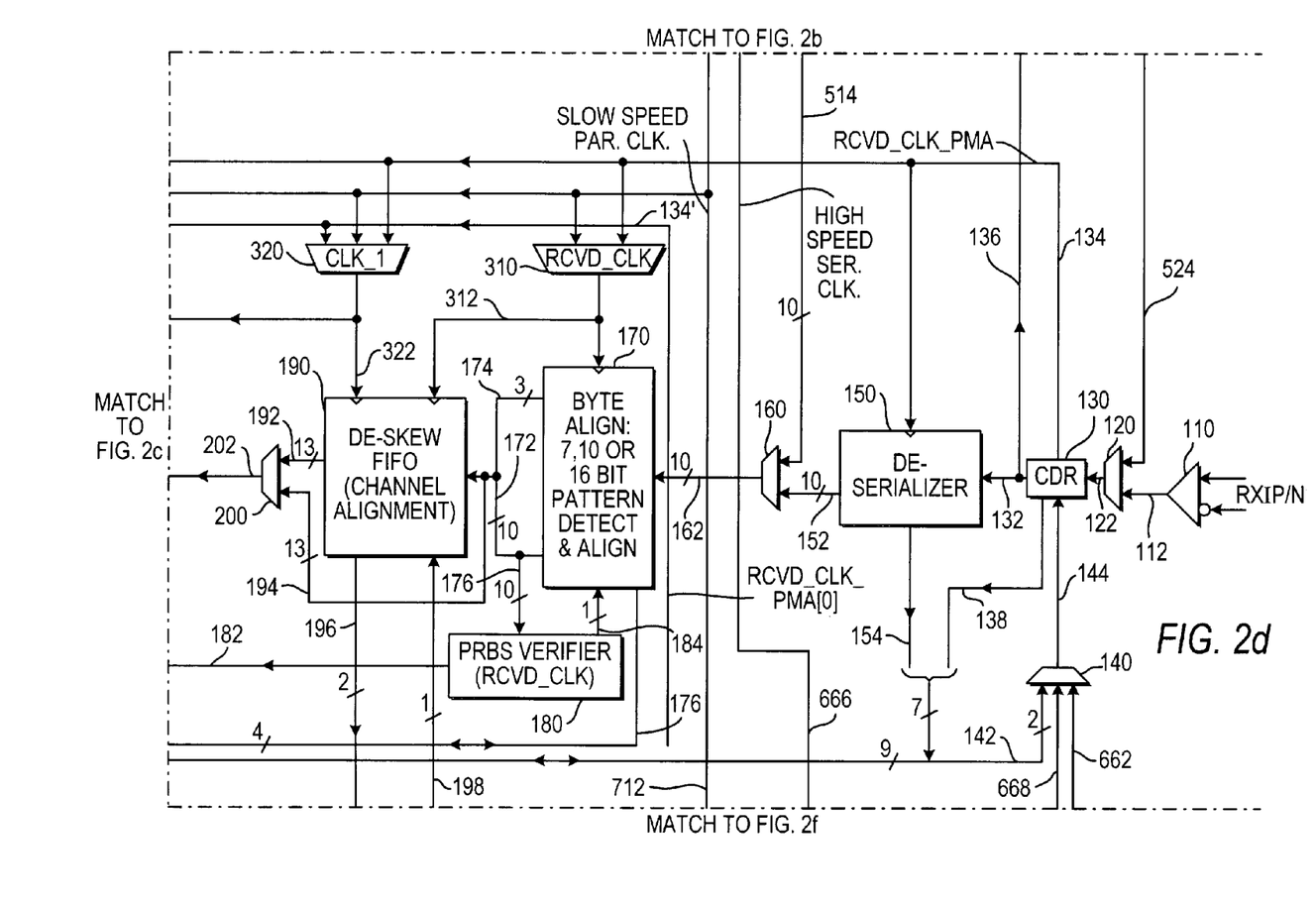
Figure 2E:
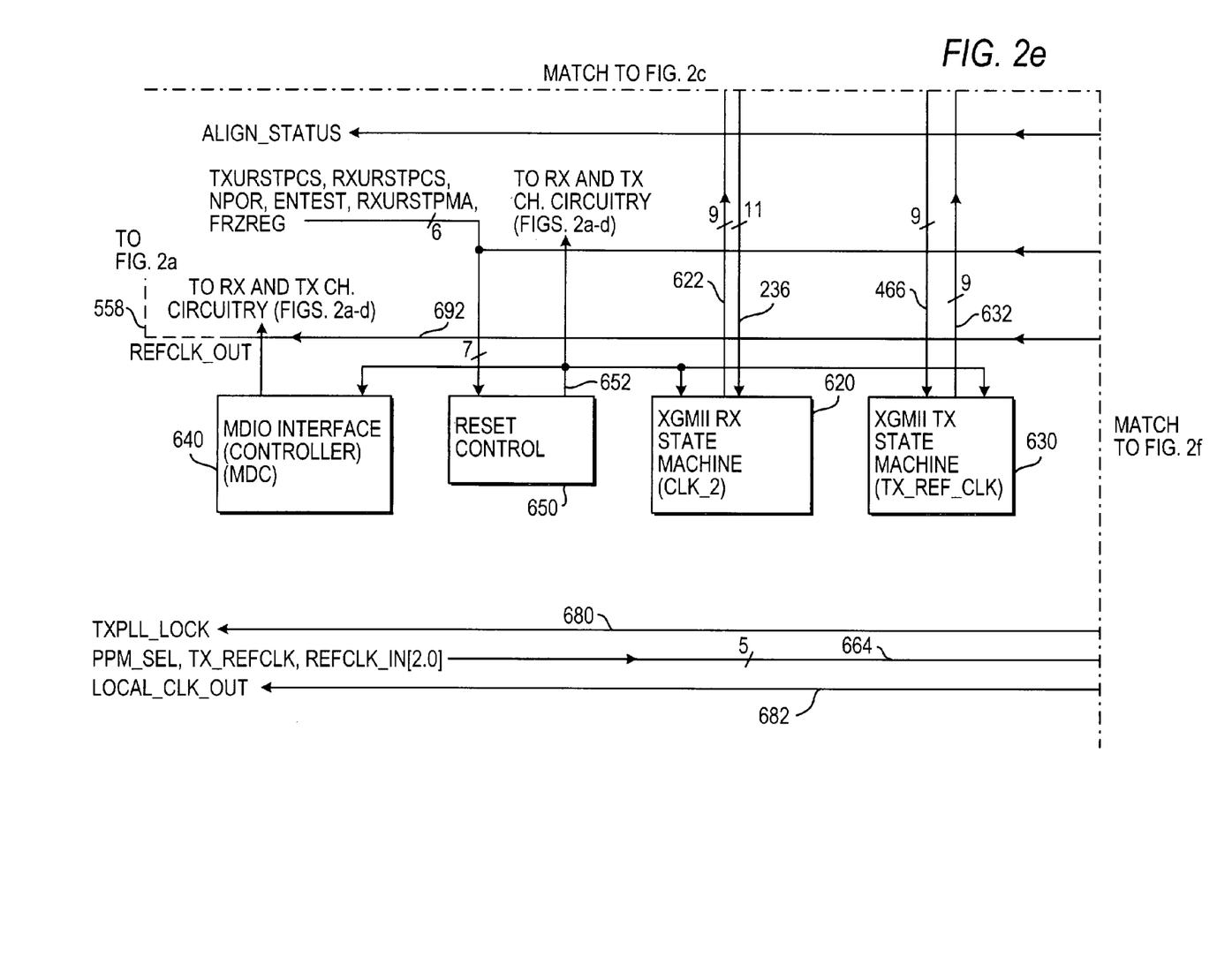
Figure 2F:
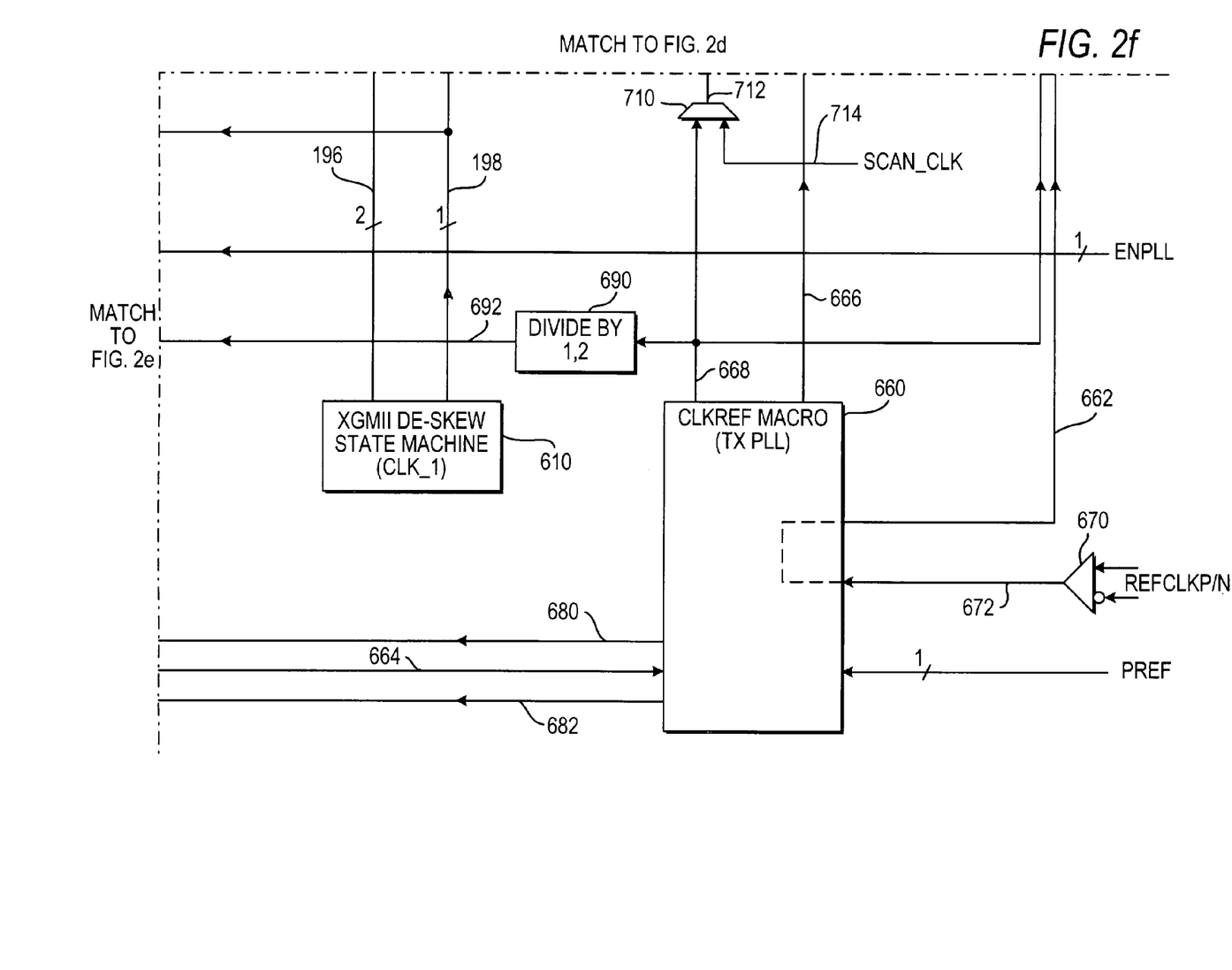

FIGS. 2a and 2b basically show the transmitter ("TX") portion of one channel of HSSI circuitry. FIGS. 2c and 2d basically show the receiver ("RX") portion of one channel of HSSI circuitry. FIGS. 2e and 2f basically show circuitry that supports four channels of transmitter and receiver circuitry (i.e., the transmitter and receiver circuitry shown in FIGS. 2a–2d and three other similar repetitions of the FIGS. 2a–2d circuitry). The circuitry of four transmitter channels, four receiver channels and one set of supporting circuitry (FIGS. 2e and 2f) is sometimes referred to as a "quad." An integrated circuit including this type of circuitry may include any number of quads (e.g., one, two, four, five, etc. quads). Grouping of channels in quads of four is only illustrative, and in other embodiments the channels may be ungrouped or grouped in numbers other than four (e.g., two, eight, etc.). The presence and/or use of both transmitter and receiver channels is also optional. For example, only transmitter channels may be provided and/or used, or only receiver channels may be provided and/or used.

In the following discussion of the circuitry of FIGS. 2a–2f the basic flow of data signals will be described first, with at most only passing reference to the clock signals and clock signal circuitry also shown in these FIGS. Later in this specification more detail will be provided regarding the clock signals and clock signal circuitry.

Considering now in more detail the representative receiver channel circuitry shown for the most part in FIGS. 2c and 2d, input driver 110 can receive a pair of differential input signals from input pins (not shown) in order to convert those signals to a single data signal on lead 112. Lead 112 is connected to one input terminal of logic connector ("LC") 120. LC 120 is preferably dynamically controllable to select either of its two input signals as its output signal on lead 122. (The other input 524 to LC 120 will be described later.) The data signal on lead 122 is applied to clock data recovery ("CDR") circuitry 130. With the help of a reference clock signal 144 from LC 140 (in this case typically a programmably controlled logic connector (and therefore sometimes referred to as a "PLC")), CDR circuitry 130 recovers from the signal on lead 122 a data signal (applied to lead 132) and a clock signal (applied to lead 134). Circuitry 130 indicates the status of its operations (e.g., whether it is satisfactorily locked on the incoming data signal) via leads 138, which connect to the associated PLD circuitry via leads 142 (see also FIG. 2c). Additional information regarding CDR circuitry is provided in the three references mentioned earlier. (As an aside, the term "LC" is generally used herein for signal selection circuitry that is preferably at least partly dynamically controllable. Dynamic control may be provided by one or more dynamic (i.e., different at different times) control signals that are not shown herein. The term "PLC" is generally used herein for signal selection circuitry that is typically entirely programmably controlled and therefore static. Programmable control may be provided by programming function control elements ("FCEs") that are not shown separately herein. But this LC/PLC distinction is employed as a matter of general information only, and it does not relate to a point of great importance. It should therefore not be assumed that complete rigor has been employed in particular uses of these terms. It will also be appreciated that in at least some cases LCs can be substituted for PLCs and vice versa. The term "selection circuitry" is sometimes used to include both LCs and PLCs.)

The data signal on lead 132 is applied to deserializer circuitry 150. This circuitry converts as many as ten successive data bits in the serial data signal on lead 132 to parallel form data bits on as many as ten leads 152. Circuitry 150 may indicate the status of its operations via one or more leads 154, which connect to the associated PLD circuitry via leads 142. Additional information regarding deserializer circuitry is provided in the three references mentioned earlier. The signals on leads 152 can be routed to leads 162 by LCs 160. (Although ten parallel LCs 160 may be provided, they are all represented by the one LC symbol in FIG. 2d.) Again, the signals on the other inputs 514 to LCs 160 will be explained later.

The parallel outputs 162 of LCs 160 are applied to byte align circuitry 170. Circuitry 170 determines the boundaries between successive bytes of data received via the receiver channel being described. Circuitry 170 typically uses special characters that are transmitted periodically to determine where the byte boundaries are. Circuitry 170 can use seven-, ten-, or 16-bit patterns to perform this task. Circuitry 170 is typically programmable with respect to the length of the patterns used. Circuitry 170 outputs to circuitry 190 up to ten parallel bits of byte-aligned data 172, and up to three parallel bits of status or control information 174. Circuitry 170 also exchanges with the associated PLD circuitry up to four additional status or control signals 176. Additional information regarding byte align circuitry is provided in the three references mentioned earlier.

PRBS verifier circuitry 180 is used in a test mode that will be described in more detail later. "PRBS" stands for pseudo-random bit sequence.

The outputs 172 and 174 of circuitry 170 are applied to de-skew FIFO circuitry 190. "De-skew" or "channel alignment" refers to making sure that bytes received via the depicted representative channel are properly synchronized with other bytes received from the same ultimate source but via other similar channels. Skew, and the resulting need for de-skew, is one of the principles discussed in the three references mentioned earlier. De-skewed bytes are output by circuitry 190 via leads 192. Leads 194 and PLCs 200 allow circuitry 190 to be bypassed if de-skewing is not needed. Circuitry 190 works (via leads 196 and 198) with state machine 610 in FIG. 2f as will be described in more detail later. Additional information regarding de-skewing circuitry is provided in the three references mentioned earlier. It may be helpful to note here, however, that in general a FIFO (i.e., a first-in/first-out memory) accepts and stores data in synchronism with a write clock signal (312 in the case of FIFO 190) and outputs the stored data on a first-in/first-out basis in synchronism with a read clock signal (322 in the case of FIFO 190). This is an operating principle characteristic of all of the FIFO elements referred to throughout this disclosure.

The output signals 202 of PLCs 200 are applied to clock compensation FIFO circuitry 210 (FIG. 2c). Circuitry 210 may also be referred to as rate matching circuitry. Its purpose is to compensate for a possible slight difference in frequency between the clock of the source from which the data being processed originated and a clock of the device that will use the received data (e.g., a clock for the PLD circuitry associated with the depicted HSSI circuitry). Circuitry 210 typically operates by occasionally deleting deletable bytes if the source clock is faster than the destination clock, or by occasionally inserting insertable bytes if the source clock is slower than the destination clock. These deletable and insertable bytes may be the same, and are typically "filler" bytes having no real meaning. Circuitry 210 exchanges status and control signals 212 with the associated PLD circuitry. The data output of circuitry 210 is applied to PLCs 220 via leads 214. Leads 216 and PLCs 220 allow circuitry 210 to be bypassed in applications that do not require the use of circuitry 210. Additional information regarding clock compensation circuitry is provided in the three references mentioned earlier.

The output signals 222 of PLCs 220 are applied to 8B-10B decoder circuitry 230. If needed and therefore used, circuitry 230 converts data from ten-bit-byte form to eight-bit-byte form. Such data manipulation is, per se, conventional, and additional information about it and 8B-10B decoder circuitry is provided in the references mentioned above. Data and control/status signals 232 output by circuitry 230 are applied to LCs 240. LCs 240 and leads 234 allow circuitry 230 to be bypassed in applications in which 8B-10B decoding is not needed/used. LCs 240 also have some other inputs 464 and 622 that will be discussed later.

The outputs 242 of LCs 240 are applied to byte deserializer circuitry 250. Circuitry 250 allows two successive bytes to be accumulated and output in parallel if the byte rate of the HSSI circuitry is too great for the PLD circuitry that will receive the HSSI output. Additional information regarding byte deserializer circuitry is provided in the three references mentioned earlier. The data outputs 252 of circuitry 250 are applied to PLCs 260. PLCs 260 and leads 254 allow circuitry 250 to be bypassed in applications that do not require byte deserializing.

The outputs 262 of PLCs 260 are applied to phase compensation FIFO circuitry 270. (Outputs 262 also have some other possible destinations 264/290 that will be described later in this specification.) Circuitry 270 effectively buffers data between the phase of a clock signal in the HSSI circuitry and the possibly different phase of a clock signal in the PLD circuitry to which the HSSI circuitry is handing off data. The data 272 output by circuitry 270 is applied to PLCs 280. PLCs 280 and leads 274 allow circuitry 270 to be bypassed in applications that do not require the use of circuitry 270.

The outputs 282 of PLCs 280 are data and status/control signals RXD_CHN[25:0] applied to the PLD circuitry associated with the HSSI circuitry.

Elements in FIGS. 2c and 2d that have not already been described will be described later.

Turning now to the representative transmitter channel shown in FIGS. 2a and 2b, data to be transmitted TXD_CHN[19:0] is applied to the HSSI circuitry from the associated PLD circuitry via leads 410. Just as the receiver channel (FIGS. 2c and 2d) may output either only one byte in parallel or two bytes in parallel, leads 410 may convey either only one byte in parallel or two bytes in parallel.

The signals on leads 410 are applied to one set of the inputs of LCs 430. The other inputs to LCs 430 will be described later. Routing of signals from leads 410 through LCs 430 is used when phase compensation and/or byte serialization are needed. Alternatively, when neither of these functions is needed, routing from leads 410 through PLCs 460 is used. In the latter case only ten of leads 410 are used because only one byte at a time is being output via leads 410.

The output signals of LCs 430 are applied to phase compensation FIFO circuitry 440. Circuitry 440 operates like above-described circuitry 270, but in the reverse direction.

The output signals of circuitry 440 are applied to byte serializer circuitry 450. Circuitry converts two bytes received in parallel to two bytes output one after another. Additional information regarding byte serialization is provided in the three references mentioned earlier.

The output signals 452 of circuitry 450 are the second set of inputs to PLCs 460. Like other PLCs through this disclosure, PLCs 460 are programmable to select either of their sets of input signals 410 or 452 as their output signals 462.

The output signals 462 of PLCs 460 are one set of the inputs to each of LCs 480 and PLCs 490. The other inputs to each of elements 480 and 490 will be described later. The routing through LCs 480 is used for applications that do not require 8B-10B encoding. The routing through PLCs 490 is used for applications that do require 8B-10B encoding.

Other possible destinations of the output signals 462 of PLCs 460 will be discussed later.

Considering first the routing through PLCs 490, the output signals of those PLCs are applied to 8B-10B encoder circuitry 500 (FIG. 2b). Circuitry 500 converts eight bits of data to ten bits of data using conventional 8B-10B encoding. The output signals 502 of circuitry 500 are one set of inputs to PLCs 510. The alternative routing from LCs 480 to PLCs 510 bypasses 8B-10B encoder circuitry 500.

The output signals 512 of PLCs 510 are applied to serializer circuitry 520. (Other destinations of signals 512 will be described later.) Circuitry 520 converts the parallel data it receives to serial output data on lead 522. Additional information regarding serializer circuitry can be found in the three references mentioned earlier.

The signal on lead 522 is one input to LC 530. Another destination of that signal and the other input to LC 530 will be described later. The output signal of LC 530 is applied to differential output driver circuitry 540, which produces differential output signals indicative of the applied signal to two output pins of the depicted circuitry.

The basic flow of data through the circuitry has now been described. Consideration will now be given to other elements and routings that have not already been described. Some of these other elements and routings relate to various possible test modes for the circuitry, as will next be described.

Connection 524 (from lead 522 in FIG. 2b to LC 120 in FIG. 2d) allows the output of the depicted transmit channel to be "looped back" into the input of the receive channel without leaving the integrated circuit that the depicted circuitry is part of. This supports a test mode that, for example, allows the PLD circuitry associated with the HSSI circuitry to output data via the transmit channel and to receive that data back via the receive channel. If the data is received back unaltered, then both the transmit and receive channels should be operating without introducing any errors into the data. This "loop back" routing is typically only used temporarily, i.e., during a test mode phase of operation of the device. This "loop back" routing is selected by controlling LC 120 to temporarily output the signal it receives via lead 524, rather than outputting the signal it receives from lead 112.

Connection 136 (from lead 132 in FIG. 2*d* to LC 530 in FIG. 2*b*) allows similar "loop back" of incoming data to output pins of the device. Use of this "loop back" routing allows the user to test the operation of elements such as input driver 110, CDR circuitry 130, and output driver 540. If test data from external circuitry is transmitted through this loop back and returned to the external circuitry error-free, then the elements in this loop should be operating satisfactorily. Again, this "loop back" routing is typically only used temporarily, i.e., during a test mode phase of operation of the device. This "loop back" routing is selected by causing LC 530 to temporarily output the signal it receives via lead 136, rather than outputting the signal it receives from lead 522.

Connections 514 (from leads 512 in FIG. 2*b* to LCs 160 in FIG. 2*d*) provide another "loop back" routing for use in testing a different subset of the elements (generally those to the left of leads 514 in FIGS. 2*a*–2*d*). Again, this routing is typically only used temporarily and is selected by causing LCs 160 to temporarily pass the signals from leads 514, rather than passing the signals from leads 152.

Still another "loop back" type of routing for testing is provided by leads 464 (from leads 462 in FIG. 2*a* to LCs 240 in FIG. 2*c*). This allows testing of still another subset of the elements (generally those to the left of leads 464 in FIGS. 2*a* and 2*c*). This "loop back" routing is used like any of the other "loop back" routings described above (i.e., by causing LCs 240 to temporarily pass signals from leads 464 to leads 242).

Leads 264 (from leads 262 in FIG. 2*c* to LCs 430 in FIG. 2*a*) provide yet another "loop back" type of routing for testing. This routing generally allows testing of elements to the right of leads 264 in FIGS. 2*a*–2*d*. It is typically used temporarily—when testing is desired—by temporarily causing LCs 430 to pass signals from leads 264 to leads 432.

Several other elements are provided to facilitate testing of various aspects of the circuitry. These include PRBS verifier circuitry 180 (FIG. 2*d*), self test verifier circuitry 290 (FIG. 2*c*), self test generator circuitry 420 (FIG. 2*a*), and PRBS generator circuitry 470 (FIG. 2*a*). As mentioned earlier, PRBS stands for "pseudo-random bit sequence."

Considering first PRBS generator circuitry 470 (FIG. 2*a*), this circuitry automatically generates a pseudo-random sequence of bits when this type of test is desired. As indicated in FIG. 2*a*, circuitry 470 uses the TX_REF_CLK signal (see FIG. 2*b*) as a clock signal. LCs 480 are then temporarily enabled to pass the output signals of circuitry 470 rather than the signals on leads 462. The output signals of circuitry 470 can be looped back to PRBS verifier circuitry 180 (FIG. 2*d*) via elements 510, 512, 514, 160, 162, 170, 172, and 176. Alternatively, the loop back employing more elements and including lead 524 can be used. If circuitry 180 receives the signals that would be expected to result from operation of circuitry 470 and proper operation of the intervening elements, then the intervening elements are operating properly. Circuitry 180 indicates proper or improper operation via the signal on lead 182. Circuitry 180 also supplies a control/status signal to circuitry 170 via lead 184. As indicated in FIG. 2*d*, circuitry 180 uses the RCVD_CLK signal output by PLC 310 (FIG. 2*d*) as a clock signal.

Self test generator circuitry 420, (FIG. 2*a*) and self test verifier circuitry 290 (FIG. 2*c*) cooperate with one another in a similar manner to perform other tests if and when desired. When enabled, circuitry 420 automatically generates a predetermined sequence of test signals. Circuitry 420 again uses the TX_REF_CLK signal (see FIG. 2*b*) as a clock signal. LCs 430 are controlled to pass those signals on to downstream elements. Any of loop back leads 464 (FIGS. 2*a* and 2*c*), 514 (FIGS. 2*b* and 2*d*), or 524 (FIGS. 2*b* and 2*d*) can be used to loop these test signals back to self test verifier circuitry 290 (FIG. 2*e*) through any of several different subsets of the elements. Circuitry 290 determines whether or not it is receiving signals that would be expected to result from operation of circuitry 420 combined with proper operation of the intervening elements. Circuitry 290 reports its results (and the status of the signal on lead 182) via leads 292. Circuitry 290 uses the CLK_2 signal output by PLC 330 (FIG. 2*c*) as a clock signal.

As has been mentioned, the circuitry shown in FIGS. 2*e* and 2*f* is for the most part shared by four receiver channels and four transmitter channels, each like the single, representative, receiver and transmitter channels shown in FIGS. 2*a*–2*d*. In other words, the circuitry shown in FIGS. 2*e* and 2*f* supports four receiver ("RX") and four transmitter ("TX") channels, only a representative one of each being shown in FIGS. 2*a*–2*d*. Although the following discussion assumes that four RX and four TX channels are associated with the FIGS. 2*e* and 2*f* circuitry and that all of those channels are in use, the numbers of channels provided could be more or less than four, and the numbers of channels in use can be less than or equal to the numbers provided.

XGMII de-skew state machine circuitry 610 (FIG. 2*f*) works with the de-skew FIFO circuitry 190 (FIG. 2*d*) in each of the four associated receiver channels. Communication between circuitries 610 and 190 is via leads 196 and 198. Circuitry 610 uses the CLK_1 output signal of PLC 320 (FIG. 2*d*) as a clock signal. A principal task of circuitry 610 (in cooperation with the associated circuitries 190) is to determine when all four circuitries 190 have received a predetermined special character, and to thereafter enable reading out from all four circuitries 190. This enables circuitries 190 to compensate for any skew that may exist among the four RX channels served by circuitry 610.

XGMII RX state machine circuitry 620 (FIG. 2*e*) works with data from all four RX channels supported by the FIGS. 2*e* and 2*f* circuitry. Circuitry 620 receives data from all four RX channels via leads like 236 (FIGS. 2*c* and 2*e*). Circuitry 620 may analyze and/or translate that data, and may send it back to the same RX channels via leads like 622 (same FIGS.). Circuitry 620 typically performs such tasks as looking for start of packet codes, looking for end of packet codes, performing error detection tasks, etc. Circuitry 620 uses the CLK_2 signal output by PLC 330 (FIG. 2*c*) as a clock signal.

XGMII TX state machine circuitry 630 (FIG. 2*e*) provides support like that provided by circuitry 620, but for the four TX channels served by the FIGS. 2*e* and 2*f* circuitry. Circuitry 630 communicates with the four TX channels it supports via connections like leads 466 and 632 (FIGS. 2*a*, 2*c*, and 2*e*). Circuitry 630 uses the TX_REF_CLK signal (see FIG. 2*b*) as a clock signal.

Management data input/output ("MDIO") interface circuitry 640 (FIG. 2*e*) is part of the IEEE specification for Gigabit Ethernet. It is used to transfer control information and status between the HSSI circuitry and higher level communication layers. The HSSI circuitry can be configured or programmed by using or not using the MDIO, as desired. MDC is a clock specified by the IEEE specification for Gigabit Ethernet and it clocks the MDIO block.

Reset control circuitry 650 (FIG. 2*e*) produces a reset control output signal 652 for ensuring synchronous reset and restart of all resettable elements throughout FIGS. 2*a*–2*f* when resetting is required. For example, reset signal 652 is applied to circuitries 620, 630, and 640 in FIG. 2e, and although not specifically shown in the other FIGS., it is also applied to appropriate elements in all four RX and TX channels supported by the FIGS. 2e and 2f circuitry.

Turning now to the circuitry related to clock signals, CLKREF macro circuitry 660 (FIG. 2f) includes phase locked loop ("PLL") circuitry. Circuitry 660 can receive a differential reference clock signal from driver circuitry 670. This differential reference clock signal comes from a source external to the integrated circuit that includes the HSSI circuitry of FIGS. 2a–2f. For example, this reference clock signal may come from the source of the data signals being transmitted to the RX channels of the HSSI circuitry, or it may come from some other external source. In addition to possibly using the output signal 672 of driver circuitry 670 as described below, circuitry 660 directly outputs that signal via lead 662 as one of the inputs to PLC 140 (FIG. 2d). Circuitry 660 also receives other possible reference clock signals (i.e., TX_REFCLK and REFCLK_IN[2:0]) via leads 664 (FIGS. 2e and 2f) from the PLD circuitry associated with the HSSI circuitry. These signals provide additional flexibility by enabling the PLD core to drive the TX PLL reference clock. PREF is a pin that is connected to a resistor off-chip.

PLL circuitry in circuitry 660 can be used to lock to any of the reference clock signals applied to circuitry 660. A locked version of that clock signal is output by circuitry 660 via lead 666 as a high speed serial clock. A divided-down-in-frequency version of that locked clock signal is output by circuitry 660 via lead 668 as a slow speed parallel clock. Circuitry 660 produces an output signal indicating that it is locked via lead 680, which connects to the associated PLD circuitry as shown in FIG. 2e. Circuitry 660 also outputs via lead 682 a so-called local clock output signal that is applied to a local clock network (not shown) that is shared by the representative quad circuitry shown in FIGS. 2a–2f and other similar quads (if any) on the same integrated circuit.

Divider circuitry 690 (FIG. 2f) divides the frequency of the slow speed parallel clock on lead 668 by 1 or 2 (a programmable selection) to produce a final REFCLK_OUT signal 692 applied to the associated PLD circuitry as shown in FIG. 2e.

Continuing with the discussion of the clock circuitry, PLC 140 (FIG. 2d) allows selection of a reference clock signal 144 for use by CDR circuitry 130 from among (1) the signal on lead 662, (2) the signal on lead 668, and (3) two reference clock signals (IQ2_REFCLK and RX_REFCLK) on leads 142 from the associated PLD circuitry (see also FIG. 2c). IQ2_REFCLK and RX_REFCLK provide additional flexibility by enabling the PLD core to drive the CDR PLL reference clock. The output signal 144 of PLD 140 is applied to CDR circuitry 130, e.g., for use as an input reference clock signal by PLL circuitry in the CDR circuitry. In addition to producing an output data signal 132, CDR circuitry 130 produces a recovered clock signal (RCVD_CLK_PMA) on lead 134. The PLL and recovered clock aspects of circuitry 130 are part of the additional information regarding CDR circuitry that can be found in the three references mentioned earlier. The recovered clock signal on lead 134 is applied (as a clock signal) to de-serializer 150 and to one of the inputs of each of PLCs 310, 320 (both in FIG. 2d), 330, and 340 (both in FIG. 2c). In the case of RX channel 0 (the "master" one of the four RX channels 0–3 supported by the circuitry shown in FIGS. 2e and 2f), the RCVD_CLK_PMA signal 134 also has other destinations as described in a later paragraph.

The other input to PLC 310 (FIG. 2d) is the output signal 712 of LC 710 (FIG. 2f). LC 710 is controllable to select as its output either the slow speed parallel clock output signal 668 of circuitry 660 or a scan clock signal (SCAN_CLK) 714. The scan clock signal is a signal used during a manufacturing test mode, which is not germane to this invention and is only mentioned here briefly and in passing for completeness. Thus, for present purposes, signal 712 can generally be assumed to be the same as signal 668, i.e., the slow speed parallel clock output by circuitry 660. PLC 310 can select either of its two input signals as the clock signal (RCVD_CLK) 312 applied to circuitry 170, and also as the write clock signal applied to circuitry 190. Although the relevant further connection is not shown in the drawings (to avoid over-crowding the drawings), the RCVD_CLK output signal 312 of PLC 310 is also applied as a clock signal to PRBS verifier circuitry 180, as was mentioned earlier. This is indicated by the legend "(RCVD_CLK)" in the block for circuitry 180.

Signal 712 is also a second input to PLC 320. The third input to PLC 320 is the RCVD_CLK_PMA signal 134' of "master" RX channel 0 mentioned in an earlier paragraph. (Reference number 134' is used to differentiate the master channel RVCD_CLK_PMA signal from the RCVD_CLK_PMA signals 134 of the other channels in the quad.) Thus in RX channel 0 PLC 320 only needs to have two inputs, because in that channel signal 134' is no different from signal 134, and so there is no need for a separate lead 134' in RX channel 0. But in RX channels 1–3 the RCVD_CLK_PMA signal 134' from RX channel 0 is also available as a third input to the PLCs 320 in those channels.

PLC 320 can select any one of its inputs to be its output signal (CLK_1) 322. Signal 322 is used as the read clock of circuitry 190. It is also used as the write clock of circuitry 210 (FIG. 2e). Signal 322 is also used as a clock signal by circuitry 610 (FIG. 2f), as indicated by the legend "(CLK_1)" in the block for circuitry 610 (the actual lead from PLC 320 to block 610 being omitted to avoid over-crowding).

Three of the inputs to PLC 330 (FIG. 2c) are the same as the inputs to PLC 320. The fourth input to PLC 330 is a PLD_RX_CLK signal 334 from the PLD circuitry associated with the HSSI circuitry. PLC 330 can select any of its inputs to be its output signal (CLK_2) 332. Signal 332 is used as the read clock of circuitry 210, as the write clock of circuitry 270, and as the clocks of circuitries 230 and 250. Circuitry 290 also uses signal 332 as a clock signal, as indicated by the legend "(CLK_2)" in the block for that circuitry (although the actual lead from PLC 330 to block 290 is not shown to avoid over-crowding the drawing).

The three inputs to PLC 320 (FIG. 2d) are also inputs to PLC 340 (FIG. 2c). PLC 340 can select any of its inputs to be its output 342, which is applied to divider circuitry 350. Circuitry 350 is programmable to divide the frequency of signal 342 by either 1 or 2 to produce output signal 352 (RX_CLK). Signal 352 is applied to one input terminal of PLC 360 and also to clock signal distribution (or "clock tree") circuitry 354 in the PLD circuitry associated with the HSSI circuitry. After passing through the PLD clock tree circuitry (and thereby experiencing whatever signal propagation delay that circuitry has), signal 352 emerges as the PLD_RX_CLK signal on lead 356. Lead 356 is connected to the other input terminal of PLC 360.

PLC 360 can select either of its two input signals to be its output signal 362 (RD_CLK). Signal 362 is the clock signal applied to the read side of phase compensation FIFO circuitry 270.

Turning now to the clock signal aspects of the transmitter channel circuitry shown in FIGS. 2a and 2b, the TX_CLK signal 560 (FIG. 2a) typically comes from clock tree circuitry 558 of the PLD circuitry associated with the HSSI circuitry. The source of this signal (prior to passing through clock tree circuitry 558) is the REFCLK_OUT signal 692 (FIG. 2e). TX_CLK signal 560 is one input to PLC 570. The other input to PLC 570 is the output 582 of circuitry 580. PLC 570 is programmable to select either of its inputs to be its output 572. This signal is the clock signal applied to the write side of phase compensation FIFO circuitry 440.

Circuitry 580 is programmable to divide by either 1 or 2 the frequency of the signal 712 applied to it. As has been mentioned, the output 582 of circuitry 580 is one of the inputs to PLC 570. Another output 584 of circuitry 580 is the read-side clock input to phase compensation circuitry 440 and the clock input to byte serializer circuitry 450.

In FIG. 2b signal 712 is the clock input to 8B-10B encoder circuitry 500 and the byte-rate clock input to serializer circuitry 520. The bit rate clock input to circuitry 520 is signal 666.

The circuitry shown in FIGS. 2a–2f is capable of supporting many different communication protocols, including both industry-standard protocols and customized protocols that a particular user may want to implement. The organization of the clock signal circuitry is particularly important in that regard. Some of these aspects of the clock signal circuitry are discussed in the next several paragraphs.

The multiple clock source selection LCs/PLCs (e.g., elements 310 and 320 (FIG. 2d) and elements 330 and 340 (FIG. 2c)) in the channels facilitates by-passing functional circuit clocks as may be required by various protocols. For example, RX_CLK (FIG. 2c signal 352) can be selected from (1) the recovered clock of channel 0 (see FIG. 2d, where this signal is identified as RCVD_CLK_PMA CH[0] signal 134'), (2) the local recovered clock (see again FIG. 2d, where this signal is identified as RCVD_CLK_PMA signal 134), and (3) a clock from TX PLL circuitry 660 (FIG. 2f; this option is the signal on leads 668/712).

Another feature is that the REFCLK_OUT signal 692 (FIG. 2e) is the output signal 668 of TX PLL circuitry 660 (FIG. 2f) divided by a programmably selectable factor W (shown to be 1 or 2 in circuitry 690 (FIG. 2f), but can be additionally or alternatively selected from other values as well, if desired).

Still another feature of the clock circuitry includes the provision of phase compensation buffers 270 (FIG. 2c) and 440 (FIG. 2a) in conjunction with the ability to derive clock signals for the PLD-side of those buffers from the clock tree networks in the PLD circuitry. For example, the read-side clock signal of buffer 270 can be the PLD_RX_CLK signal from PLD clock tree circuitry 354, and the write-side clock signal of buffer 440 can be the TX_CLK signal from PLD clock tree circuitry 558. These signals can come from the PLD clock tree(s) at locations that are physically close to the locations of PLD registers and other circuitry that may be used to receive or supply data signals from or to the HSSI circuitry. The phase relationship between these clock signals and operation of the PLD registers and other circuitry can therefore be very close, improving the speed and reliability with which data signals can be exchanged between the PLD circuitry and the phase compensation FIFOs 270/440. The presence of phase compensation FIFOs with this PLD-side clock capability greatly improves the interface between the PLD circuitry and the HSSI circuitry. These phase compensation buffers at the PLD interface of both the receiver and transmitter channels simplify clocking.

Figure 3:
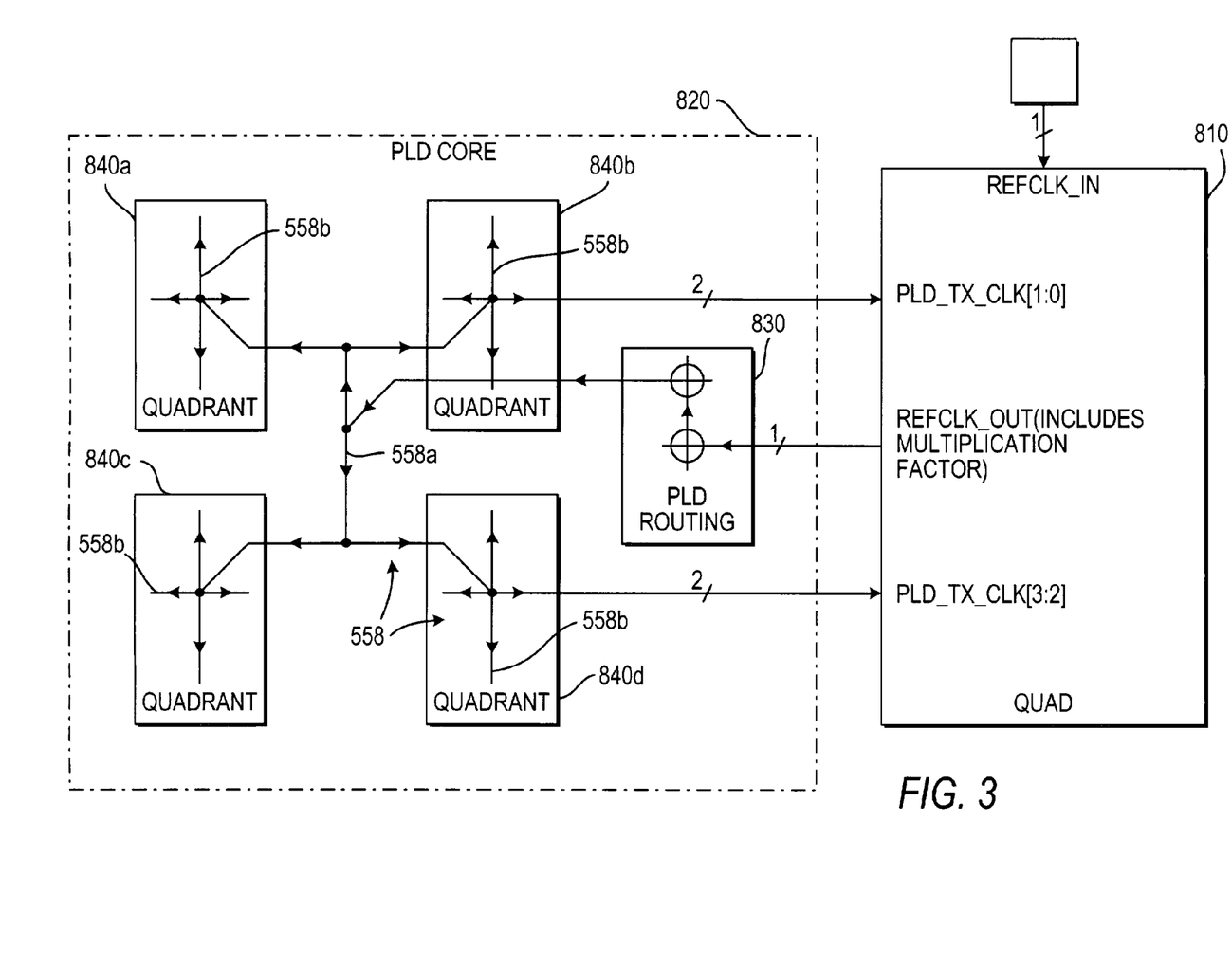
FIG. 3 is a simplified schematic block diagram of circuitry of the type shown in FIGS. 2a–2f, but high-lighting other possible aspects of that illustrative circuitry.

RX channel output registers and TX channel input registers can be treated the same way as PLD logic element registers from the perspective of clock tree distribution. This is achieved by making available to the PLD the REFCLK_OUT (FIG. 2e) from each quad and the RX_CLK from each RX channel. As shown in FIG. 3, for example, the REFCLK_OUT signal from representative HSSI quad circuitry 810 is applied to PLD routing circuitry 830 in associated PLD circuitry 820. Routing circuitry 830 routes the REFCLK_OUT signal into the clock tree circuitry 558 in the PLD core circuitry. In the illustrative embodiment shown in FIG. 3 the logic circuitry in the PLD core is divided into four quadrants 840a–d. Clock tree circuitry 558 has two hierarchical levels: a "global" level 558a that distributes clock signals to the four quadrants 840, and a "local" level 558b that distributes clock signals within each of the four quadrants 840. The REFCLK_OUT signal is distributed using circuitry 558 and preferably exits from that circuitry (as signals PLD_TX_CLK[3:0]) at locations that are physically close to the quad 810 that will use those signals. Because quad 810 will also typically receive data signals from physically nearby logic elements in quadrants 840b and/or 840d, there is little or no phase difference between those data signals and the PLD_TX_CLK signals that control reception of those data signals in the HSSI circuitry of quad 810. To briefly recapitulate, REFCLK_OUT can drive the PLD global/local clock trees and thus easily transfer data from any LE in the PLD core to the TX input registers (in the phase compensation FIFO 440 in FIG. 2a). REFCLK_OUT is driven back into the HSSI circuitry as PLD_TX_CLK as shown in FIGS. 2a and 3.

Figure 4:
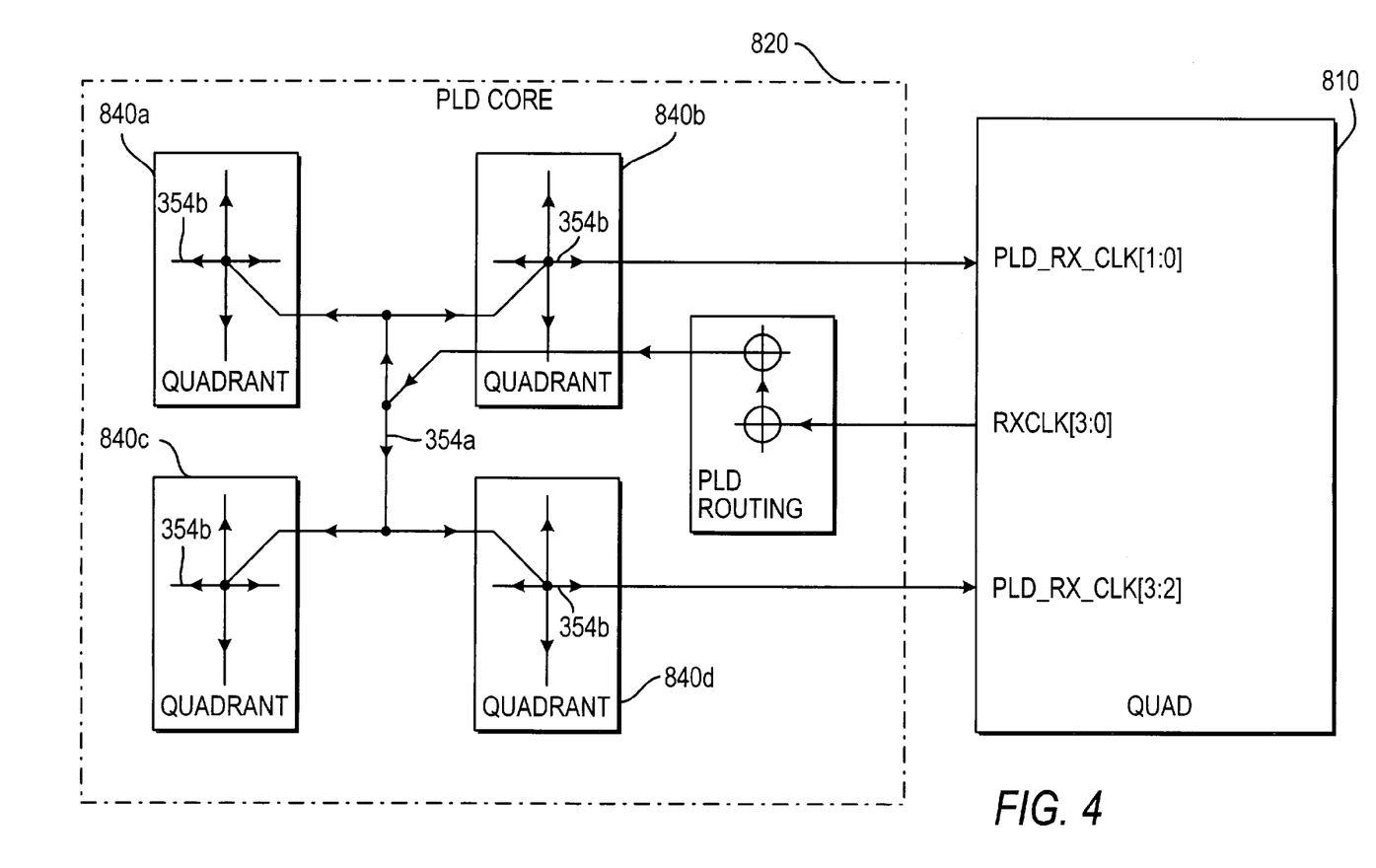
FIG. 4 is a simplified schematic block diagram similar to FIG. 3, but high-lighting still other possible aspects of circuitry of the type shown in FIGS. 2a–2f.

FIG. 4 is similar to FIG. 3, but for the RXCLK signals. (Although different reference numbers 354, 354a, and 354b are used for the clock trees in FIG. 4, it will understood that these can be the same as elements 558, 558a, and 558b in FIG. 3, or they can be different subsets of the same structures.) Thus the RXCLK signals can drive the PLD global/local clock trees and easily transfer data from the RX output (in phase compensation FIFO 270 in FIG. 2c) to any logic element in the PLD core. RXCLKs are driven back into the HSSI circuitry as PLD_RX_CLKs.

Continuing with other features and advantages of the clock circuitry, the four channels of the quad can derive their reference clocks from multiple sources or the same source. For example, the RX channel CDR reference clock 144 (FIG. 2d) can be driven from the associated PLD circuitry (leads 142; FIGS. 2d and 2c), an input pin (elements 670, 672, and 662; FIGS. 2f and 2d), or TX PLL circuitry 660 and lead 666 (FIGS. 2f and 2d). All four channels' TX clocks 668/712 (FIGS. 2f and 2b) are derived from the common quad PLL circuitry. The reference clock for the common quad PLL circuitry can be driven from the associated PLD circuitry (leads 664; FIGS. 2e and 2f) or from an input pin (REFCLKP/N in FIG. 2f).

The clock circuitry shown herein allows the individual RX and TX channels to operate at different data rates, although there is a single TX PLL 660 (FIG. 2f).

The data bus can be "stepped down" (de-serialized) in speed by doubling the output data bus width (N to 2N).

Different parallel loop backs can be supported because of the flexible clock selection.

Figure 5:
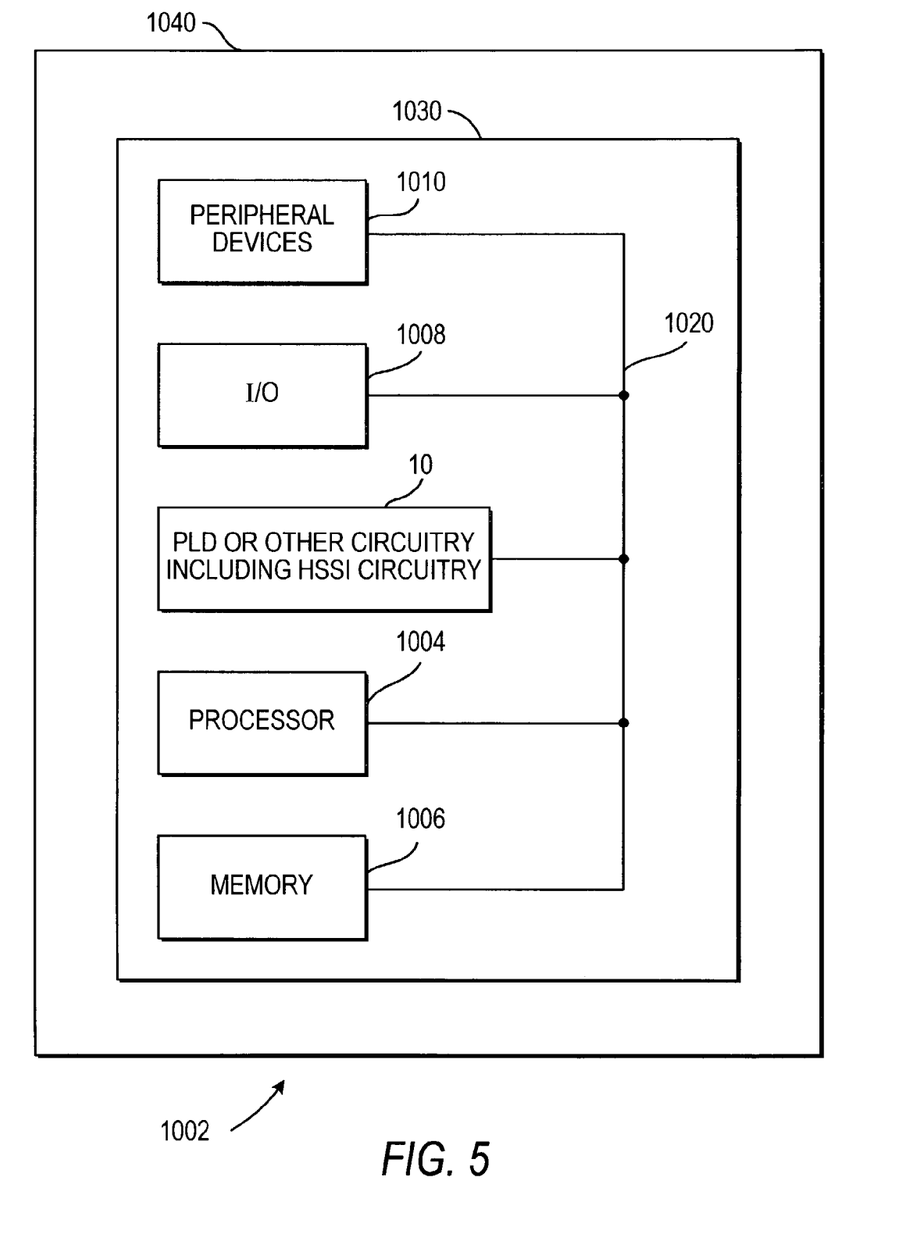
FIG. 5 is a simplified block diagram of an illustrative system employing circuitry in accordance with the invention.

FIG. 5 illustrates a PLD or other circuitry 10 including HSSI circuitry in accordance with this invention in a data processing system 1002. Data processing system 1002 may include one or more of the following components: a processor 1004; memory 1006; I/O circuitry 1008; and peripheral devices 1010. These components are coupled together by a system bus or other interconnections 1020 (which may include HSS connections) and are populated on a circuit board 1030 that is contained in an end-user system 1040.

System 1002 can be used in a wide variety of applications, such as computer networking, data networking, instrumentation, video processing, digital signal processing, or any other application. Circuitry 10 may be used to perform a variety of different logic functions. For example, circuitry 10 may be configured as a processor or controller that works in cooperation with processor 1004. Circuitry 10 may also be used as an arbiter for arbitrating access to a shared resource in system 1002. In yet another example, circuitry 10 can be configured as an interface between processor 1004 and one of the other components in system 1002. It should be noted that system 1002 is only exemplary, and that the true scope and spirit of the invention should be indicated by the following claims.

Various technologies can be used to implement PLDs (like the circuitry 10 in FIG. 5 and the circuitry shown in the other FIGS.). For example, the technology used can be based on EPROMs, EEPROMs, pass transistors, transmission gates, antifuses, laser fuses, metal optional links, mask programmability, function control registers (e.g., as in Wahlstrom U.S. Pat. No. 3,473,160), etc. From the various examples mentioned above it will be seen that this invention is applicable to both one-time-only programmable and reprogrammable devices.

It will be understood that the foregoing is only illustrative of the principles of the invention, and that various modifications can be made by those skilled in the art without departing from the scope and spirit of the invention. For example, not all of the elements shown in FIGS. 2a–2f need to be included in all embodiments of the invention. Similarly, in other embodiments of the invention the order of some of the elements can be different than the order shown in FIGS. 2a–2f.

The invention claimed is:

1. Interface circuitry for conveying data signals from an input port to utilization circuitry comprising:
   phase compensation circuitry having first and second clock inputs, and being constructed to store, in synchronism with a first clock signal applied to the first clock input, data derived from the input port, and to subsequently output that data to the utilization circuitry in synchronism with a second clock signal applied to the second clock input, wherein the utilization circuitry comprises clock signal distribution circuitry, and wherein the interface circuitry further comprises:
   first circuitry that is able to apply a clock signal from the interface circuitry to the clock signal distribution circuitry for distribution by that circuitry; and
   second circuitry that is able to apply a clock signal that has been distributed by the clock signal distribution circuitry to the phase compensation circuitry as the second clock signal.

2. An integrated circuit comprising the interface circuitry and the utilization circuitry defined in claim 1.

3. The integrated circuit defined in claim 2 wherein the utilization circuitry comprises logic circuitry.

4. The integrated circuit defined in claim 3 wherein the logic circuitry is at least partly programmable.

5. The interface circuitry defined in claim 1 wherein the clock signal that has been distributed by the clock signal distribution circuitry is the clock signal from the first circuitry after distribution by the clock signal distribution circuitry.

6. The interface circuitry defined in claim 1 wherein the first circuitry is able to select the clock signal that is applied to the clock distribution circuitry to be substantially the same as the first clock signal.

7. The interface circuitry defined in claim 1 wherein the phase compensation circuitry comprises:
   first-in/first-out circuitry.

8. The interface circuitry defined in claim 1 further comprising:
   first selection circuitry that is able to select the first clock signal from a plurality of clock signal sources.

9. The interface circuitry defined in claim 1 further comprising:
   second selection circuitry that is able to select the second clock signal from multiple clock signal sources.

10. The interface circuitry defined in claim 1 further comprising:
    clock data recovery circuitry for recovering data information and clock information from the data signals from the input port.

11. The interface circuitry defined in claim 10 further comprising:
    deserializer circuitry for converting the recovered data information from serial to parallel form data information.

12. The interface circuitry defined in claim 11 further comprising:
    byte alignment circuitry for reconstructing bytes of information in the parallel form data information and outputting byte-aligned data information.

13. The interface circuitry defined in claim 12 wherein the interface circuitry is one channel of a plurality of such channels of interface circuitry, and wherein the interface circuitry further comprises:
    channel de-skew circuitry for substantially eliminating any difference in byte-aligned data information phase between the interface circuitry and others of the such channels.

14. The interface circuitry defined in claim 12 further comprising:
    clock compensation circuitry for compensating for any difference in frequency between a clock characteristic of data signals from the input port and another clock signal.

15. The interface circuitry defined in claim 12 further comprising:
    8B-10B decoder circuitry for operating on the byte-aligned data information.

16. The interface circuitry defined in claim 12 further comprising:
    byte deserializer circuitry for accumulating successive bytes of byte-aligned data information and outputting such accumulated bytes as parallel byte form data.

17. The interface circuitry defined in claim 16 wherein the phase compensation circuitry is able to operate on the parallel byte form data.

18. The interface circuitry defined in claim 8 further comprising:
    clock data recovery circuitry for recovering data information and clock information from the data signals from the input port, wherein the clock information thus recovered is one of the plurality of clock signal sources.

19. The interface circuitry defined in claim 8 further comprising:
    a clock port for receiving an external reference clock signal, a signal derived from which is one of the plurality of clock signal sources.

20. The interface circuitry defined in claim 19 further comprising:
phase-locked loop circuitry for processing the external reference clock signal to produce the one of the plurality of clock signal sources.

21. A digital processing system comprising:
processing circuitry:
a memory coupled to the processing circuitry; and
interface circuitry as defined in claim 1 coupled to the processing circuitry and the memory.

22. A printed circuit board on which is mounted interface circuitry as defined in claim 1.

23. The printed circuit board defined in claim 22 further comprising:
a memory mounted on the printed circuit board and coupled to the interface circuitry.

24. The printed circuit board defined in claim 22 further comprising:
processing circuitry mounted on the printed circuit board and coupled to the interface circuitry.

25. Interface circuitry for conveying data signals from an input port to utilization circuitry comprising:
phase compensation circuitry having first and second clock inputs, and being constructed to store, in synchronism with a first clock signal applied to the first clock input, data derived from the input port, and to subsequently output that data to the utilization circuitry in synchronism with a second clock signal applied to the second clock input;
first selection circuitry that is able to select the first clock signal from a plurality of clock signal sources; and
clock data recovery circuitry for recovering data information and clock information from the data signals from the input port, wherein the clock information thus recovered is one of the plurality of clock signal sources, and wherein the interface circuitry is one channel of a plurality of such channels of interface circuitry, one of the channels being a master channel, and wherein in channels other than the master channel the clock information recovered in the master channels is one of the plurality of clock signal sources.

26. Interface circuitry for conveying data signals from source circuitry to an output port comprising:
phase compensation circuitry having first and second clock inputs, and being constructed to store, in synchronism with a first signal applied to the first clock input, data derived from the source circuitry, and to subsequently output that data in synchronism with a second clock signal applied to the second clock input, the data thus output by the phase compensation circuitry being used to determine data output by the output port, wherein the source circuitry comprises clock signal distribution circuitry, and wherein the interface circuitry further comprises:
first circuitry that is able to apply a clock signal from the interface circuitry to the clock signal distribution circuitry for distribution by that circuitry; and
second circuitry that is able to apply a clock signal that has been distributed by the clock signal distribution circuitry to the phase compensation circuitry as the first clock signal.

27. An integrated circuit comprising the interface circuitry and the source circuitry defined in claim 26.

28. The integrated circuit defined in claim 27 wherein the utilization circuitry comprises logic circuitry.

29. The integrated circuit defined in claim 28 wherein the logic circuitry is at least partly programmable.

30. The interface circuitry defined in claim 26 wherein the clock signal that has been distributed by the clock signal distribution circuitry is the clock signal from the first circuitry after distribution by the clock signal distribution circuitry.

31. The interface circuitry defined in claim 26 wherein the first circuitry is able to select the clock signal that is applied to the clock distribution circuitry to be substantially the same as the second clock signal.

32. The interface circuitry defined in claim 26 wherein the phase compensation circuitry comprises:
first-in/first-out circuitry.

33. The interface circuitry defined in claim 26 further comprising:
first selection circuitry that is able to select the first clock signal from a plurality of clock signal sources.

34. The interface circuitry defined in claim 26 wherein the phase compensation circuitry is able to operate on a plurality of data bytes in parallel.

35. The interface circuitry defined in claim 34 further comprising:
byte serializer circuitry for receiving a plurality of data bytes in parallel from the phase compensation circuitry and for outputting those bytes one after another in succession.

36. The interface circuitry defined in claim 26 further comprising:
8B-10B encoder circuitry for operating on bytes of data output by the phase compensation circuitry.

37. The interface circuitry defined in claim 26 further comprising:
serializer circuitry for converting data output by the phase compensation circuitry to serial form.

38. Interface circuitry for use with other circuitry that includes clock signal distribution circuitry, the interface circuitry processing data signals passing between the other circuitry and a data port, comprising:
first circuitry for applying a first clock signal associated with the interface circuitry to the clock signal distribution circuitry for distribution by that circuitry to produce a distributed clock signal;
data signal processing circuitry that processes data signals in the interface circuitry in accordance with an applied clock signal; and
second circuitry for applying the distributed clock signal from the clock signal distribution circuitry to the data signal processing circuitry as the applied clock signal;
wherein the first circuitry comprises selection circuitry that is able to select the first clock signal from a plurality of clock signal sources;
wherein at least one of the clock signal sources is selected from the group consisting of (1) a first recovered clock signal produced by first clock data recovery circuitry, (2) a clock signal derived from a reference clock signal from an external source, and (3) a second recovered clock signal produced by second clock data recovery circuitry; and
wherein the first clock data recovery circuitry is part of the interface circuitry and the second clock data recovery circuitry is in other similar interface circuitry.

39. The interface circuitry defined in claim 38 wherein the data signal processing circuitry comprises:
phase compensation circuitry.

40. The interface circuitry defined in claim 39 wherein the phase compensation circuitry comprises:
first-in/first-out circuitry.

41. The interface circuitry defined in claim 38 wherein the first circuitry comprises:
  divider circuitry that is able to divide the frequency of a clock signal by a selectable factor to produce the first clock signal.

42. The interface circuitry defined in claim 38 wherein the second circuitry comprises:
  divider circuitry that is able to divide the frequency of the distributed clock signal by a selectable factor to produce the applied clock signal.

43. Interface circuitry for use with other circuitry that includes clock signal distribution circuitry, the interface circuitry processing data signals passing between other circuitry and a data port, comprising:
  first circuitry for applying a first clock signal associated with the interface circuitry to the clock signal distribution circuitry for distribution by that circuitry to produce a distributed clock signal;
  data signal processing circuitry that processes data signals in the interface circuitry in accordance with an applied clock signal; and
  second circuitry for applying the distributed clock signal from the clock signal distribution circuitry to the data signal processing circuitry as the applied clock signal;
  wherein the data signal processing circuitry comprises phase compensation circuitry; and
  wherein the phase compensation circuitry is connected to output data for application to the other circuitry in response to a read clock signal that is based on the applied clock signal.

44. Interface circuitry for use with other circuitry that includes clock signal distribution circuitry, the interface circuitry processing data signals passing between other circuitry and a data port, comprising:
  first circuitry for applying a first clock signal associated with the interface circuitry to the clock signal distribution circuitry for distribution by that circuitry to produce a distributed clock signal;
  data signal processing circuitry that processes data signals in the interface circuitry in accordance with an applied clock signal; and
  second circuitry for applying the distributed clock signal from the clock signal distribution circuitry to the data signal processing circuitry as the applied clock signal;
  wherein the data signal processing circuitry comprises phase compensation circuitry; and
  wherein the phase compensation circuitry is connected to input data coming from the other circuitry in response to a write clock signal that is based on the applied clock signal.

45. Interface circuitry for conveying data signals from an input port to utilization circuitry comprising:
  phase compensation circuitry having first and second clock inputs, and being constructed to store, in synchronism with a first clock signal applied to the first clock input, data derived from the input port, and to subsequently output that data to the utilization circuitry in synchronism with a second clock signal applied to the second clock input;
  first selection circuitry that is able to select the first clock signal from a plurality of clock signal sources; and
  second selection circuitry that is able to select the second clock signal from multiple clock signal sources, at least some of which are also in the plurality of clock signal sources.

* * * * *